United States Patent [19]

Maxfield et al.

[11] Patent Number: 4,472,487
[45] Date of Patent: Sep. 18, 1984

[54] BATTERY HAVING POLYMERIC ANODE COATED WITH REACTION PRODUCT OF OXIRANE COMPOUND

[75] Inventors: MacRae Maxfield, North Plainfield; Granville G. Miller, Morristown; Ray H. Baughman, Morris Plains; Jane E. Frommer, Mendham Township, Morris County, all of N.J.

[73] Assignee: Allied Corporation, Morris Township, Morris County, N.J.

[21] Appl. No.: 556,735

[22] Filed: Nov. 30, 1983

[51] Int. Cl.$^3$ .............................................. H01M 6/14
[52] U.S. Cl. .................... 429/194; 429/199; 429/213
[58] Field of Search ................ 429/194, 197, 213, 199

[56] References Cited

U.S. PATENT DOCUMENTS

| | | | |
|---|---|---|---|
| 3,957,533 | 5/1976 | Mead et al. ......................... | 429/213 |
| 4,296,185 | 10/1981 | Catanzarite ...................... | 429/194 X |
| 4,315,976 | 2/1982 | Conte .................................. | 429/194 |
| 4,318,969 | 3/1982 | Peled .............................. | 429/194 X |
| 4,321,114 | 3/1982 | MacDiarmid et al. ......... | 429/213 X |
| 4,326,014 | 4/1982 | Dey ................................ | 429/194 X |
| 4,379,817 | 4/1983 | Kozawa .......................... | 429/194 X |

*Primary Examiner*—Charles F. LeFevour
*Attorney, Agent, or Firm*—Alan M. Doernberg; Gerhard H. Fuchs

[57] ABSTRACT

Rechargable battery with a conjugated backbone polymer anode which has been coated, when in the reduced state, by contact with a monomer with a reactive oxirane group. Reduced polyacetylene anodes, after reaction with ethylene oxide, offer improved stability to solvents.

21 Claims, No Drawings

BATTERY HAVING POLYMERIC ANODE COATED WITH REACTION PRODUCT OF OXIRANE COMPOUND

DESCRIPTION

The present invention relates to batteries with polymeric electrodes, and especially such electrodes having conjugated backbone polymers as the electroactive material coated with the product of reaction between reduced conjugated backbone polymers and an oxirane compound such as ethylene oxide or propylene oxide.

Conjugated backbone polymers, e.g., polyacetylene, polyphenylene, polyacenes, polythiophene, poly(phenylene vinylene), polyazulene, poly(phenylene sulfide), poly(phenylene oxide), polythianthrene, poly(phenylquinoline), polyaniline, and polypyrrole, have been suggested for use in a variety of applications based upon their characteristic of becoming conductive when oxidized or reduced either chemically or electrochemically. The secondary battery application described, e.g., in MacDiarmid et al. U.S. Pat. No. 4,321,114 (1981), employs one or more electrodes having conjugated backbone polymers as electroactive material. Such electrodes can, for example, be reversibly electrochemically reduced and complexed with alkali metal or tetraalkylammonium cations during battery cycling, most commonly with insertion of cations into a polymer anode (the negative battery electrode) occuring during charging. Generally, the more such cations are inserted, the more conductive the electrode becomes and the more cathodic the potential of the anode becomes.

While higher energy and power densities for such batteries would generally be achieved by greater reduction levels of such polymer anodes, there are usually self-discharge and/or solvent- or salt-degradation reactions which occur between such a highly reduced polymer anode and typical electrolytes. Several modifications of the electrolyte have been proposed to minimize these reactions and permit high charging levels. It is desirable, however, to be relatively free of such constraints on choice of solvent and dissolved salt so that other beneficial properties such as salt solubility, free ion transport, electrolyte conductivity, solution viscosity, and stability to the charged cathode can be maximized. In particular, coatings on the anode which exclude solvent from the reduced polymer anode would permit solvents to be used which otherwise react with the reduced polymers.

BRIEF DESCRIPTION OF INVENTION

Coatings formed by oxirane compounds on reduced polymer battery anodes have been found to improve the stability of such anodes with respect to solvents such as propylene carbonate. It is theorized that such stability is achieved by precluding the insertion of the solvent into the anode (while the alkali metal cation inserts through the coating). Precluding solvent insertion would have the additional beneficial effects of limiting swelling of the anode on charging and limiting the required solvent amounts. Accordingly, the present invention includes a battery comprising:

(a) an anode comprising a conjugated backbone polymer which has been coated when in a reduced state by contact with a monomer with a reactive oxirane group, (b) an electrolyte comprising an organic solvent and an alkali-metal salt, and (c) a cathode;

alkali-metal cations from said electrolyte being inserted into said anode during the charging of said battery;

with said coating being of sufficient coverage on said anode to substantially exclude contact of the electrolyte solution with the active anode material.

The polymer which forms the electroactive material of the anode of the present battery may be any of a variety of conjugated backbone polymers. The polymers disclosed specifically in U.S. Pat. No. 4,321,114 may be used: polyacetylene (PA), polyphenylene (PPP if in para form), poly(phenylene sulfide), poly(phenylene vinylene) and polypyrrole. Other conjugated backbone polymers, claimed by others to be useful in batteries, may also be used in the present invention: polythiophene, polyazulene, poly(phenylquinoline), polyacenes, poly(phenylene oxide) and polynaphthalene. As a general matter, conjugated backbone polymers stable when reduced and complexed by alkali metal cations are highly preferred, with all the above listed polymers qualifying on this basis except, perhaps, poly(phenylene sulfide), poly(phenylene oxide) and polypyrrole. Polyacetylene and poly(p-phenylene) are the most preferred polymers for the present electrodes.

The electrodes need not be limited to the conjugated backbone polymer, but rather may contain other constituents such as metallic or graphite conductivity aids and current collectors, inert binders or mechanical supports and non-polymeric electroactive materials. In many electrodes, however, the conjugated backbone polymer is a major proportion, or even essentially all of the bulk material and of the surface which is coated by the reaction product of the oxirane compound.

The coating of the present polymeric electrodes is difficult to characterize by its own structure, and therefore can best be understood as the product of reaction between a donor-doped (reduced) conjugated backbone polymer and an oxirane compound. It is possible that the oxirane compound forms graft polymers (e.g., poly(ethylene oxide) chains covalently bonded to the polymer anion).

It is possible, but not necessary, to have the conjugated backbone polymer chemically donor-doped prior to such reaction. For example, by prior chemical doping with organometallic compounds such as butyllithium, ethylsodium or the like (as described in copending commonly-assigned application S.N. 556,718 of Ronald L. Elsenbaumer et al., filed herewith) being suitable. In many embodiments, the anode is electrochemically reduced so as to be inserted with alkali metal cations and then exposed to the oxirane compound. In addition, the oxirane compound may be present in solution during the electrochemical reduction.

Suitable oxiran compounds can be illustrated by the formulae

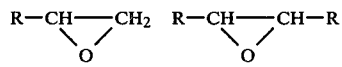

wherein R may be independently hydrogen or any monofunctional organic moiety unreactive with reduced polymer. Examples include ethylene oxide, propylene oxide and 1,2-butylene oxide. Also suitable are multifunctional epoxides such as the diglycidyl ether of various aromatic diols (e.g. bisphenol A) or polyols (e.g., the diglycidyl ether of poly(propylene oxide)).

The method of surface-coating may consist merely of leaving the charged electrode in contact with a solvent containing or consisting of the oxirane compound for a controlled period. It is generally desirable, in order to achieve adequate surface-coating, that the polymer be doped to an extent of at least that sufficient to reduce its electrochemical potential to 1.0V (versus a reversible lithium reference) or less, although lesser reduction levels (higher potentials) may be adequate provided that the reaction is given a longer period of time to occur. It is not required that the coating occur in a battery configuration, since, for example, a series of electrodes can be chemically doped in the manner of application S.N. 556,718 or electrochemically doped, and then placed in a bath containing the oxirane compound. Similarly, a series of electrodes can be each connected electrically to a source of alkali metal (e.g., a lithium electrode) in a bath containing oxirane compound and a solvent in which is dissolved a lithium salt.

The reaction of reduced polyacetylene with ethylene oxide has been described by G. F. Dandreaux et al. at a March 1983 conference, with a view toward forming solid electrolytes. See Org. Coatings & Appl. Pol. Sci. Proc., vol. 48, page 541 (ACS 1983) (Preprint for Paper Presented at March 20-25, 1983 Meeting at Seattle, Washington). No use of the coated polymer with liquid electrolytes is suggested.

Furthermore, once the surface coating is formed, it is not necessary that the electrode remain reduced; and it may, in fact, be subsequently freed of inserted alkali-metal cations by battery cycling. In such event, the coated electrode can be assembled at a later time into the battery of the present invention. It is preferred, however, to leave the surface-coated polymer electrode with at least a minimal amount of incorporated alkali metal cations so that the high resistance of the undoped polymer need not be overcome on subsequent doping or redoping. It is also generally preferred that the reaction occur in the housing of the ultimate battery or immediately before placing the electrode in such housing.

Once the surface-coated polymeric electrode is formed, it may be used in a variety of batteries. Three common uses of the polymeric electrode are as an anode versus an acceptor-doped (oxidized) polymeric cathode (which is inserted with anions during charging), as an anode versus an inorganic ion-insertion cathode such as a transition metal chalcogenide (which is intercalated by alkali metal cations during discharging), and as a cathode (inserted with alkali metal cations during discharging) versus an alkali metal anode (which is plated by alkali metal such as lithium during charging). Several illustrative battery configurations are tabulated in Table I below, with the ratios representing proportions of solvent to oxirane compound. It is preferred in all instances that the conjugated backbone polymer be polyacetylene (PA). Furthermore, it is preferred that such anode be inserted either with lithium cations during charging or with sodium cations during charging, with potassium cations being next most preferred. In general, the co-insertion of solvent with alkali-metal cations into uncoated electrodes is greatest with lithium and least with potassium.

TABLE 1

| | Anode | Cathode | Electrolyte |
|---|---|---|---|
| 1 | PEO-coated PA** | PA | $LiPF_6$/(PC + PO) (95:5) |
| 2 | PPO-coated PA* | $TiS_2$ | $LiClO_4$/(THF + PO) (95:5) |
| 3 | PEO-coated PA** | $TiS_2$ | $LiClO_4$/THF |
| 4 | PPO-coated PA* | $LiCoO_2$ | $LiPF_6$/(SL + PO) (95:5) |
| 5 | PBO-coated PA* | $LiCoO_2$ | ($LiPF_6$ + $KPF_6$/ (AN + BO) (95:5) |
| 6 | PEO-coated PA** | PA | $LiPF_6$/PC |
| 7 | PEO-coated PPP** | $Cr_xV_{1-x}S_2$ | $LiPF_6$/THF |
| 8 | Li | PEO-coated PA** | $LiClO_4$/THF |

*coated on 1st cycle
**previously coated by exposure of reduced (n-doped) polymer to ethyleneoxide as a gas or in solution.
PO: Propylene oxide (could also be ethylene oxide)
BO: butylene oxide
PEO: Poly(ethylene oxide)
PPO: poly(propylene oxide)
PBO: poly(butylene oxide)
PA: polyacetylene
PPP: poly(p-phenylene)
PC: propylene carbonate
THF: tetrahydrofuran
SL: sulfolane
AN: acetonitrile Preferred solvents for the present batteries include ethers, whose already-high stability to reduced polymer may be marginally enhanced by the surface coating, and the following solvents which are themselves generally unstable to uncoated highly reduced polymers:

(a) carbonates, such as propylene carbonate and ethylene carbonate, (b) nitriles, such as acetonitrile and benzonitrile (c) organosulfur compounds, such as sulfolane, methylsulfolane, dimethylsulfolane, dimethyl sulfite, dimethyl sulfoxide and glycol sulfite, (d) organophosphorus compounds, such as hexamethylphosphoramide and trimethyl phosphate, (e) esters, such as ethyl acetate and methyl formate.

Preferred salts for the electrolyte of the present batteries are of the formula MA where M is Li, Na or K and A is $BF_4$, $PF_6$, $ClO_4$ or $CF_3SO_3$. Hexafluorophosphates are most preferred.

The battery cathodes may be either oxidized conjugated backbone polymer (inserted by anions during charging), transition-metal chalcogenide (inserted by alkali metal on discharging) or other conventional ioninsertion cathodes for non-aqueous batteries. Suitable transition metal chalcogenide cathodes are those listed on page 392 of "Lithium Batteries" edited by J. P. Gabano (Academic Press, 1983) and in K. M. Abraham, Solid State Ionics, vol. 7, pp. 199-212 (1982) (both incorporated herein by reference). These include (with approximate open circuit potentials when fully charged or devoid of inserted cations):

| | |
|---|---|
| $Li_xMoO_2$ | 1.6 V versus Li/Li$^+$ |
| $Na_xVSe_2$ | 1.7 V versus Na/Na$^+$ |
| $Li_xNiPS_3$ | 1.8 V versus Li/Li$^+$ |
| $Li_xVSe_2$ | 2.0 V versus Li/Li$^+$ |
| $Na_xTiS_2$ | 2.1 V versus Na/Na$^+$ |
| $Na_xNbS_2Cl_2$ | 2.2 V versus Na/Na$^+$ |
| $Li_xFe_{0.25}V_{0.075}S_2$ | 2.4 V versus Li/Li$^+$ |
| $Li_xTiS_2$ | 2.5 V versus Li/Li$^+$ |
| $LiMoS_3$(amorphous) | 2.5 V versus Li/Li$^+$ |
| $Na_xCr_{0.5}V_{0.5}S_2$ | |
| $Na_xWO_{3-y}$ | 2.6 V versus Na/Na$^+$ |
| $Na_xMoS_3$(amorphous) | 2.7 V versus Na/Na$^+$ |
| $Na_xTaS_2$ | 2.7 V versus Na/Na$^+$ |
| $K_xWO_{3-y}$ | |
| $Li_xMoO_3$ | 2.8 V versus Li/Li$^+$ |

| | |
|---|---|
| $Li_xV_6O_{13}$ | 2.9 V versus $Li/Li^+$ |
| $Li_xCr_{0.5}V_{0.5}S_2$ | 2.9 V versus $Li/Li^+$ |
| $Li_xW_{0.2}V_{2.8}O_7$ | 3.0 V versus $Li/Li^+$ |
| $Na_xCoO_2$ | 3.3 V versus $Na/Na^+$ |
| $Li_xCr_3O_8$ | 3.6 V versus $Li/Li^+$ |
| $Li_xCoO_2$ | 4.7 V versus $Li/Li^+$ |

Suitable polymer cathodes include oxidized polyacetylene, poly(p-phenylene), polyacenes, poly(phenylene vinylene), polyazulene, polynaphthalene, poly(phenylene sulfide), poly(phenylene oxide), polyphenothiazine, polyaniline, polypyrrole, polythiophene, polythianthrene and substituted versions of the above. Such polymers may be coated by reaction, when oxidized, with pyrroles, thiophenes, azulenes, anilines or furans, as described in copending, commonly-assigned application (S.N. 556,720), filed herewith, the disclosure of which is incorporated herein by reference.

EXAMPLE 1

Samples of polyacetylene (PA) film prepared from the Shirakawa catalyst (H. Shirakawa and S. Ikeda, Synth. Met. 1, 175 (1979/80)), were wrapped in platinum gauze and potassium doped by exposing them to a tetrahydrofuran (THF) solution of potassium naphthalide from 15 min. to 16 h. They were washed repeatedly with dry THF and evacuated prior to a 15 min. exposure to about one-half atmosphere of ethylene oxide gas. The weight increase of the polymer during the procedure varied from 10 to 100% depending on the doping time.

A cell was constructed with 1M $LiClO_4$ in propylene carbonate using a ethylene oxide coated, lightly doped PA sample as the cathode, 2 cm$^2$ of Li foil as the anode and glass filter paper as the separator. A constant current of 13 $\mu A$ was allowed to pass between the electrodes so that Li metal was oxidized at the battery anode to $Li^+$ cation and PA was reduced at the battery cathode to $PA^-$. During the 37.4 h discharge, the cell voltage fell from 1.7V to 0.3V and remained below 0.4V for the next 6 h at open circuit (OCV). A potential of 1.0–2.5V was applied to the cell, now with an internal resistance of 100–160 $\Omega$, causing current to flow in the opposite direction for 16 h so as to recharge the cell to an OCV of about 2.0V. The charge passed on recharge (undoping of PA) corresponded to a maximum of 3% doping of CH units in PA. The ratio of recharge to discharge, coulombic efficiency, was 47%

The recharge of the next cycle (3% doping) was performed 19 h after the discharge (at which time the OCV was 0.41V), with coulombic efficiency of 95%. Higher rates (82 $\mu A$=1.0% per hour) and higher doping levels (discharge=5.2% doping) were attainable in a similarly-constructed cell having as current collector, instead of platinum gauze, a 20 nm layer of gold sputtered onto one side of the PA before reaction with ethylene oxide.

COMPARATIVE EXAMPLE 2

A cell comprised of 7 mg of PA (1.4 cm$^2$) wrapped in platinum guaze, 3 cm$^2$ of Li foil counter electrode, 0.5 ml of 1M $LiClO_4$ in dry propylene carbonate and a glass filter paper separator was cycled between the voltages of 0.4V and 2.5V. The capacities (and coulombic efficiencies) were 4.1% (55%), 1.2% (25%) and 0.87% (42%).

We claim
1. A battery comprising:
   (a) an anode comprising a conjugated backbone polymer which has been coated when in a reduced state by contact with a monomer with a reactive oxirane group
   (b) an electrolyte comprising an organic solvent and an alkali-metal salt, and
   (c) a cathode;
   alkali-metal cations from said electrolyte being inserted into said anode during the charging of said battery;
   with said coating being of sufficient coverage on said anode to substantially exclude contact of the electrolyte solution with the active anode material.
2. The battery of claim 1 wherein said conjugated backbone polymer of said anode is polyacetylene.
3. The battery of claim 2 wherein said alkali-metal salt of said electrolyte is a lithium salt.
4. The battery of claim 3 wherein said monomer with a reactive oxirane group is propylene oxide.
5. The battery of claim 3 wherein said monomer with a reactive oxirane group is ethylene oxide.
6. The battery of claim 2 wherein said monomer with a reactive oxirane group is propylene oxide
7. The battery of claim 2 wherein said monomer with a reactive oxirane group is ethylene oxide.
8. The battery of claim 7 wherein said solvent is an ether.
9. The battery of claim 7 wherein said solvent is tetrahydrofuran or 2-methyltetrahydrofuran.
10. The battery of claim 7 wherein the solvent is an alkylene carbonate.
11. The battery of claim 10 wherein the solvent is pyopylene carbonate.
12. The battery of claim 2 wherein said solvent is an ether.
13. The battery of claim 2 wherein said solvent is tetrahydrofuran or 2-methyltetrahydrofuran.
14. The battery of claim 2 wherein said solvent is an alkylene carbonate.
15. The battery of claim 14 wherein the solvent is propylene carbonate.
16. The battery of claim 1 wherein said solvent is an ether.
17. The battery of claim 1 wherein said solvent is tetrahydrofuran or 2-methyltetrahydrofuran.
18. The battery of claim 1 wherein the solvent is a nitrile.
19. The battery of claim 1 wherein the solvent is an alkylene carbonate.
20. The battery of claim 19 wherein said solvent is propylene carbonate.
21. The battery of claim 1 wherein the alkali metal salt is an alkali metal hexafluorophosphate.

* * * * *